United States Patent [19]

Zanoni et al.

[11] Patent Number: 4,883,357
[45] Date of Patent: Nov. 28, 1989

[54] DUAL HIGH STABILITY INTERFEROMETER

[75] Inventors: Carl A. Zanoni, Middlefield, Conn.; Alan H. Field, San Jose, Calif.

[73] Assignee: Zygo Corporation, Middlefield, Conn.

[21] Appl. No.: 317,672

[22] Filed: Mar. 1, 1989

[51] Int. Cl.[4] .............................................. G01B 9/02
[52] U.S. Cl. .................................. 356/349; 356/358; 356/363
[58] Field of Search ...................... 356/344, 358, 363

[56] References Cited

U.S. PATENT DOCUMENTS 4,746,216  5/1988  Sommargren ....................... 356/349
4,752,133  6/1988  Sommargren ....................... 356/349

Primary Examiner—Davis L. Willis
Assistant Examiner—Matthew W. Koren
Attorney, Agent, or Firm—Bryan, Cave, McPheeters & McRoberts

[57] ABSTRACT

A dual high stability interferometer system capable of measuring linear and angular displacement simultaneously of a movable plane mirror (90) comprises a frequency stabilized laser input beam (10) which is divided into two parallel spatially displaced beams by a beamsplitter (14). An optical system (20) is disposed to produce a first output beam having two orthogonally polarized components in which the phase difference between the two components of the third output beam is related to four times the linear displacement of the movable plane mirror (90) at a first position. A polarizer (93) mixes the orthogonal components of the third output beam with the interference between the two polarization components being detected by a photodetector (94) which produces an electrical signal (96) from which a phase meter/accumulator (99) extracts the phase change, with this phase change being related to four times the linear displacement of the movable mirror (90) at the first position. The optical system (20) also produce a second output beam whose orthogonally polarized components have a phase difference related to four times the linear displacement of the movable mirror (90) at a second position. Another polarizer (95) mixes these orthogonal components and a photoelectric detector (194) and another phase meter/accumulator (109) cooperate to provide a second measured phase which is related to four times the linear displacement of the movable mirror (90) at the second position.

51 Claims, 1 Drawing Sheet

DUAL HIGH STABILITY INTERFEROMETER

CROSS REFERENCE TO RELATED APPLICATION

This application is related to the three commonly owned, co-pending applications, two of Gary E. Sommargren and one of Carl A. Zanoni, all entitled "Linear and Angular Displacement Measuring Interferometer," bearing U.S. Ser. Nos. 07/216,844; 07/216,821; and 07/216,843, respectively, and all filed July 8, 1988, the contents of which are specifically incorporated by reference herein in their entirety.

BACKGROUND OF THE INVENTION

1. Field of the Invention

The present invention relates to apparatus for the simultaneous measurement of both the linear and angular displacements of a plane mirror. More particularly, the invention relates to optical apparatus which is useful for high accuracy linear and angular displacement metrology using interferometry.

2. Prior Art

High accuracy linear and angular displacement measurements are required in the machine tool industry and in the semi-conductor industry. Linear displacement is commonly measured with an interferometer. Angular displacement is commonly measured with either an interferometer or an autocollimator.

There are numerous interferometer configurations which can be used to measure the linear displacement of a plane mirror. The plane mirror interferometer and the differential plane mirror are the two most common, see for example, S. J. Bennett, "A Double-Passed Michelson Interferometer," Opt. Comm. 4, pp. 428–430, 1972 R. R. Baldwin and G. J. Siddall, "A Double-Pass Attachment for the Linear and Plane Interferometer," Proc. SPIE, Vol. 480, pp. 78–83 (May 1984), and G. E. Sommargren, U.S. Pat. No. 4,693,605, issued Sept. 15, 1987.

Sommargren, U.S. Pat. No. 4,717,250, issued Jan. 5, 1988, describes an angular displacement measuring interferometer.

It is possible to measure simultaneously the linear and angular displacements of a plane mirror by using either (1) two linear displacement interferometers offset from each other, or (2) a linear displacement interferometer and an angular displacement interferometer, or an autocollimator.

However, using two devices, one to measure linear displacement and the second to measure either linear displacement or angular displacement, has the following disadvantages: (1) complexity because two devices must be installed and aligned, (2) considerable space is needed thereby requiring that the size of the mirror being measured be increased, especially if it moves in a direction in the plane of the mirror, and (3) poor thermal and mechanical stability.

The present invention retains the preferred characteristics of both the linear displacement interferometer and the angular displacement interferometer while avoiding the serious limitations of using two of these devices. In the present invention, linear and angular displacements of a plane mirror are measured in a single, compact dual high stability interferometer. The improvements of the present invention thusly overcome the disadvantages of the prior art and allow the high accuracy, simultaneous measurement of both linear and angular displacements of a plane mirror, i.e., to a small fraction of a micrometer an of an arc second, respectively, required for precision high speed X-Y stages.

SUMMARY OF THE INVENTION

In accordance with the instant invention, we provide a dual high stability interferometer system capable of measuring accurately linear displacement and angular displacement simultaneously of a movable plane mirror comprising: (1) a source of a frequency stabilized input beam with two linear orthogonally polarized components which may or may not be of the same frequency; (2) means to divide said input beam into two parallel, spatially displaced beams; (3) means, most preferably an optical system comprised of a polarization beamsplitter, two quarter-wave phase retardation plates, and a stationary plane reference mirror, and a first retroreflector, to reflect one polarization component of one of said spatially displaced beams twice from a first position on said movable plane mirror to produce a first output beam and to reflect the other polarization component of said spatially displaced input beam twice from said stationary plane mirror to produce a second output beam; (4) means, said polarization beamsplitter, for recombining said first and second output beams into a third output beam having two orthogonally polarized components in which the phase difference between the two components of the third output beam is related to four times the linear displacement of said movable plane mirror at said first position; (5) means, most preferably a first polarizer, for mixing said orthogonal components of said third output beam; (6) means, most preferably a first photoelectric detector, to produce a first electrical measurement signal; (7) means, most Preferably a first phase meter/accumulator, for indicating a first measured phase, the first measured phase being related to four times the linear displacement of said movable plane mirror at said first position; (8) means, most preferably said optical system and a second retroreflector, to reflect one polarization component of the second of said spatially displaced beams twice from a second position on said movable plane mirror to produce a fourth output beam and to reflect the other polarization component of said second spatially displaced beam twice from said stationary plane mirror to produce a fifth output beam; (9) means, said polarization beamsplitter, for recombining said fourth and fifth output beams into a sixth output beam having two orthogonally polarized components in which the phase difference between two components of the sixth output beam is related to four times the linear displacement of said movable plane mirror at said second position; (10) means most preferably a second polarizer, for mixing said orthogonal components of said sixth output beam; (11) means, most preferably a second photoelectric detector, to produce a second electrical measurement signal; and (12) means, most preferably a second phase meter/accumulator for indicating a second measured phase, the second measured phase being related to four times the linear displacement of said movable plane mirror at said second position.

THE DRAWINGS

In the drawings, FIG. 1 depicts in schematic form one embodiment of the instant invention to simultaneously measure linear displacement and angular displacement.

DETAILED DESCRIPTION OF THE INVENTION

Figure 1:
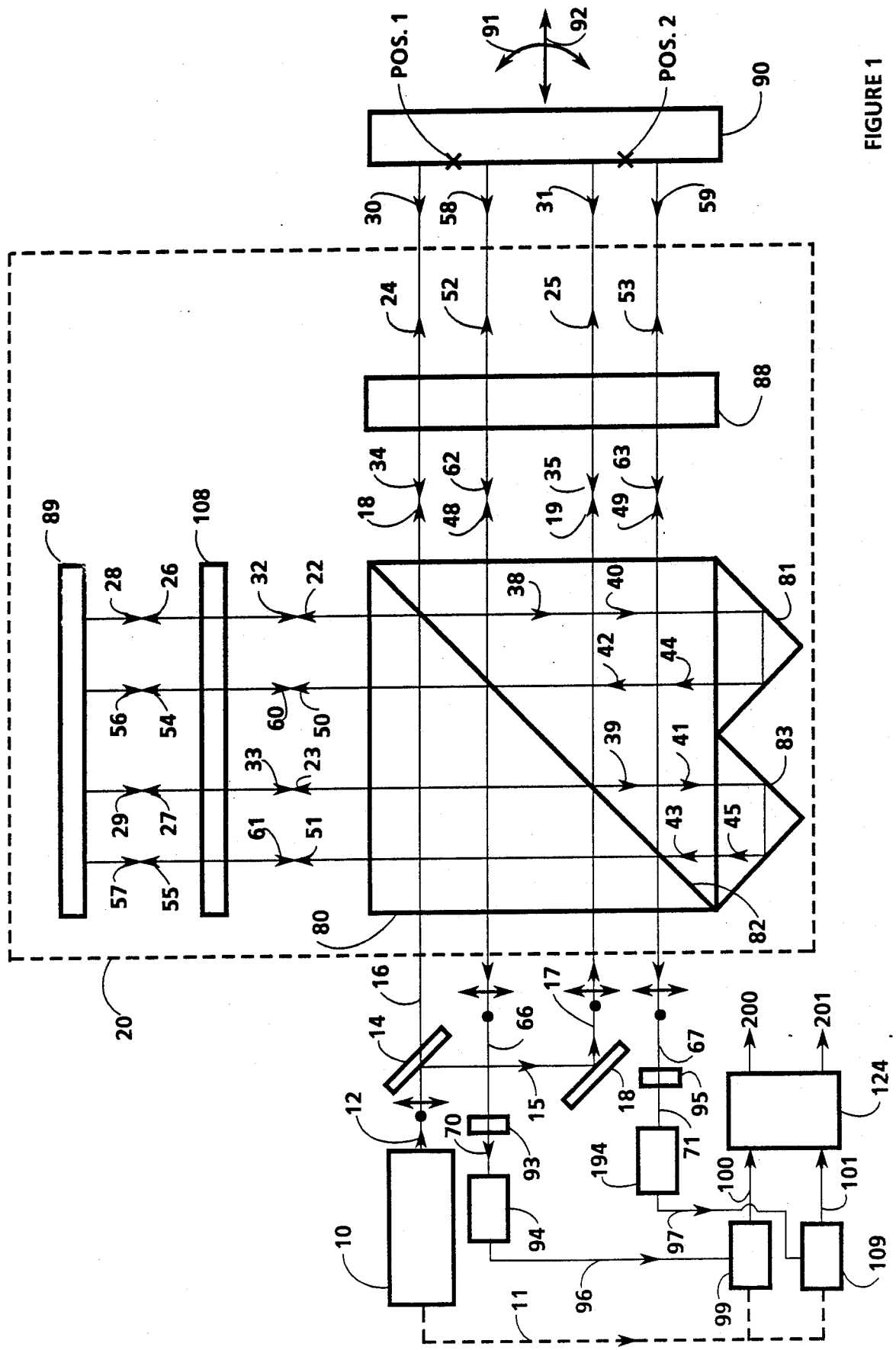

FIG. 1 depicts in schematic form one embodiment of the instant invention. While the apparatus has application for a wide range of radiation sources, the following description is taken by way of example with respect to an optical measuring system. Light source (10), which most preferably uses a frequency stabilized laser, emits input beam (12) which is comprised of two linear, orthogonally polarized components as indicated by the dot and arrow, which may or may not be of the same optical frequency. If the frequencies are the same, see for example, Downs, et al., U.S. Pat. No. 4,360,271, issued November 23, 1982. If the frequencies are different, see for example, Bagley, et al., U.S. Pat. No. 4,668,940, issued Aug. 25, 1987, in which source (10) would provide an electrical reference signal (11), shown by the dotted lines, which would correspond to the frequency difference between the two stabilized frequencies. No such reference signal (11) is provided when the two orthogonally polarized components comprising input beam (12) are of the same frequency.

Beam (12) is incident on beamsplitter (14) which transmits fifty percent of the intensity as beam (16) and reflects fifty percent of the intensity to form beam (15). Beam (15) reflects off mirror (18) to form beam (17) which is Parallel to but spatially offset (displaced) from beam (16). There are a variety of means for producing a pair of parallel offset beams from a single beam. Beamsplitter (14) can be either a plate type or a cube type comprised of two right angle prisms. Mirror (18) can be either a front surface plate type or the hypotenuse of a right angle prism using either an internal or external reflection from the hypotenuse. A parallel plate with suitable areas of beamsplitter and reflective optical coatings can be used to produce beams (16) and (17). Beams (16) and (17) can also be produced by a monolithic beamsplitter/fold mirror assembly composed of a right angle prism bonded to a parallelogram prism.

Beams (16) and (17) are incident on linear and angular displacement interferometer (20).

Beam (16) is used to measure linear displacement of movable plane mirror (90) at position 1 as follows: Beam (16) enters polarization beamsplitter (80) and is incident on polarization coating (82). The polarized beam component in the plane of the figure, denoted by the arrow, is transmitted by coating (82) as beam (18) while the polarized beam component perpendicular to the plane of the figure, denoted by the dot, is reflected by polarization coating (82) as beam (22). Beams (18) and (22) pass through quarter-wave phase retardation plates (88) and (108), respectively, and are converted into circularly polarized beams (24) and (26), respectively. Beam (26) is reflected from stationary plane mirror (89) as beam (28) while beam (24) is reflected from movable plane mirror (90), affixed to the stage (not shown) whose relative position and angle is being measured, as beam (30). Beams (30) and (28) pass back through quarter-wave phase retardation plates (88) and (108), respectively, and are converted back into linearly polarized beams (32) and (34), respectively, which are orthogonally polarized beams (22) and (18), respectively. Beams (34) and (32) are incident on polarization coating (82) of polarization beamsplitter (80). Because their polarizations have been rotated 90 degrees, beam (32) is transmitted as beam (38) and beam (34) is reflected as beam (40). Beams (38) and (40) are reflected by retroreflector (81) as beams (42) and (44), respectively, by means of the properties of retroreflector (81). Beams (42) and (44) are incident on polarization coating (82) of polarization beamsplitter (80). Beam (42) is transmitted as beam (50) and beam (44) is reflected as beam (48). Beams (48) and (50) pass through quarter-wave phase redardation plates (88) and (108), respectively, and are converted into circularly polarized beams (52) and (54), respectively. Beam (54) is reflected from stationary reference mirror (89) as beam (56) while beam (52) is reflected from movable mirror (90) as beam (58). Beams (58) and (56) pass back through quarter-wave phase retardation plates (88) and (108), respectively, and are converted back into linearly polarized beams (60) and (62), respectively, which now have the same polarization as beams (22) and (18), respectively. Beams (60) and (62) are incident on polarization coating (82) of polarization beamsplitter (80). Beam (62) is transmitted and beam (60) is reflected so that they are recombined by polarization beamsplitter (80) to form beam (66). Beam (66) has two orthogonal polarization components. The relative phase between these two polarization components depends on the optical path length traversed by each polarization component. Translation of movable plane mirror (90), as indicated by arrow (92), causes the relative phase to change. This phase change is directly proportional to four times the linear displacement of movable plane mirror (90) at position 1. Position 1 is the point equidistant from where beams (24) and (52) strike mirror (90). Beam (66) passes through polarizer (93), oriented at 45 degrees to each polarization component, which mixes the two polarization components in beam (66) to give beam (70). The interference between the two polarization components is detected by photodetector (94) producing electrical signal (96). Phase meter/accumulator (99) extracts the phase change form electrical signal (96). When the two polarization components of beam (12) are of the same optical frequency, reference signal (11) is not required and phase meter/accumulator (99) extracts the phase change from signal (96) as described in aforementioned U.S. Pat. No. 4,360,271. However, when the two polarization components of beam (12) are of different frequencies, additional sinusoidal electrical reference (11) equal in frequency to the difference between the two optical frequencies is required and phase meter/accumulator (99) extracts the phase change from signal (96) as described in aforementioned U.S. Pat. No. 4,688,940. In either event, phase meter/accumulator (99) provides output (100) which is directly proportional to the linear displacement of movable mirror (90) at position 1.

Beam (17) enters polarization beamsplitter (80) and is incident on polarization coating (82). The polarized beam component in the plane of the figure, denoted by the arrow, is transmitted by coating (82) as beam (19) while the polarized beam component perpendicular to the plane of the figure, denoted by the dot, is reflected by coating (82) as beam (23). Beams (19) and (23) pass through quarter-wave phase retardation Plates (88) and (108), respectively, and are converted into circularly polarized beams (25) and (27), respectively. Beam (27) is reflected from stationary mirror (89) as beam (29) while beam (25) is reflected by movable plane mirror (90), affixed to the stage (not shown) whose relative position and angle are being measured, as beam (31). Beams (31) and (29) pass back through quarter-wave phase retardation plates (88) and (108), respectively, and are converted back into linearly polarized beams (35) and (33), respectively, which are orthogonally polarized beams (19) and (23), respectively. Beams (35) and (33) are incident on polarization coating (82) of polarization beamsplitter (80). Because their polarizations have been rotated 90 degrees, beam (33) is transmitted as beam (39) and beam (35) is reflected as beam (41). Beams (39) and (41) are reflected by retroreflector (83) as beams (43) and (45), respectively. Beams (43) and (45) travel parallel to beams (39) and (41), respectively, by means of the properties of retroreflector (83). Beams (43) and (45) are incident on polarization coating (82) of polarization beamsplitter (80). Beam (43) is transmitted as beam (51) and beam (45) is reflected as beam (49). Beams (49) and (51) pass through quarter-wave phase retardation plates (88) and (108), respectively, and are converted into circularly polarized beams (53) and (55), respectively. Beams (53) and (55) are reflected from movable plane mirror (90) and stationary plane mirror (89) as beams (59) and (57), respectively. Beams (59) and (57) pass back through quarter-wave phase retardation plates (88) and (108), respectively, and are converted back into linearly polarized beams (63) and (61), respectively. Beams (63) and (61) are incident on polarization coating (82) of polarization beamsplitter (80). Beam (63) is transmitted and beam (61) is reflected so that they are recombined by polarization beamsplitter (80) to form beam (67). Beam (67) has two orthogonal polarization components. The relative phase between these two polarization components depends on the path length traversed by each polarization component. This phase change is directly proportional to four times the linear displacement at position 2 of movable plane mirror (90) and is measured by passing beam (67) through polarizer (95), oriented at 45 degrees to each polarization component, which mixes the two polarization components in beam (67) to give beam (71). The interference between the two polarization components is detected by photodetector (194) producing electrical signal (97). Phase meter/accumulator (109) extracts the phase change from electrical signal (97). When the two polarization components of beam (12) are of the same optical frequency, reference signal (11) is not required and phase meter/accumulator (109) extracts the phase change from signal (97) as described in aforementioned U.S. Pat. No. 4,360,271. However, when the two polarization components of beam (12) are of different frequencies, additional sinusoidal electrical reference (11) equal in frequency to the difference between the two optical frequencies is required and phase meter/accumulator (109) extracts the phase change from signal (97) as described in aforementioned U.S. Pat. No. 4,688,940. In either event, phase meter/accumulator (109) provides output (101) which is directly proportional to the average linear displacement (92) of movable plane mirror (90) at position 2.

In order to simultaneously measure the angular displacement of movable plane mirror (90), there are several options. The linear displacement (92) of movable plane mirror (90) can be measured by using either output (100) or (101) or by using electronic module (124) to yield an output (200) equal to one-half the sum of output (100) and (101). By subtracting the output (100) from output (101) using electronic module (124), an output (201) is provided which is directly proportional to the angular displacement (91) of movable plane mirror (90).

For maximal mechanical and thermal stability, the optical elements used to produce the two parallel, displaced beams and the two quarter-wave phase retardation plates and the stationary plane mirror can be mounted with minimal air paths and maximal thermal contact with the polarization beamsplitter.

The principal advantages of the instant invention are: (1) a single device provides the simultaneous measurement of both linear and angular displacement, (2) it is compact, and (3) it has high mechanical and thermal stability.

Although the invention has been described with respect to a light source which emits two stabilized, orthogonally polarized beams of different frequencies, it can also be used when the frequencies are equal without departing from the spirit and scope of the present invention.

While a preferred embodiment of the invention has been disclosed, obviously modification can be made therein, without departing from the scope of the invention as defined in the following claims.

What is claimed is:

1. A dual high stability interferometer system capable of measuring linear displacement and angular displacement simultaneously of a movable plane mirror comprising a source of a frequency stabilized input beam with two linear orthogonally polarized components; means for dividing said input beam into two parallel, spatially displaced beams; optical system means comprising a stationary plane reference mirror, said optical system being disposed to reflect one polarization component of one of said spatially displaced beams twice from a first position on said movable plane mirror to produce a first output beam and to reflect the other polarization component of said spatially displaced beams twice from said stationary plane mirror to produce a second output beam; means disposed for recombining said first and second output beams into a third output beam having two orthogonally polarized components in which the phase difference between the two components of the third output beam is related to four times the linear displacement of said movable plane mirror at said first position; means disposed for mixing said orthogonal components of said third output beam; means disposed to produce a first electrical measurement signal; means associated with said first electrical measurement signal for indicating a first measured phase, said first measured phase being related to four times the linear displacement of said movable plane mirror at said first position; means disposed to reflect one polarization component of the second of said spatially displaced beams twice from a second position on said movable plane mirror to produce a fourth output beam and to reflect the other polarization component of said second of said spatially displaced beams twice from said stationary plane mirror to produce a fifth output beam; means disposed for recombining said fourth and fifth output beams into an sixth output beam having two orthogonally polarized components in which the phase difference between the two components of the sixth output beam is related to four times the linear displacement of said movable plane mirror at said second position; means disposed for mixing said orthogonal components of said sixth output beam; means disposed to produce a second electrical measurement signal; and means associated with said second electrical measurement signal for indicating a second measured phase, said second measured phase being related to four times the linear displacement of said movable plane mirror at said second position.

2. An interferometer system in accordance with claim 1 wherein said frequency stabilized input beam source comprises a laser.

3. An interferometer system in accordance with claim 2 wherein said input beam components are of the same optical frequency.

4. An interferometer system in accordance with claim 2 wherein said input beam components are of different optical frequencies.

5. An interferometer system in accordance with claim 1 wherein said input beam components are of the same optical frequency.

6. An interferometer system in accordance with claim 1 wherein said input beam components are of different optical frequencies.

7. An interferometer system in accordance with claim 4 wherein said input source further comprises means for providing an electrical reference signal to said means for indicating said first and second measured phases, said reference signal corresponding to the frequency difference between said two different stabilized frequencies.

8. An interferometer system in accordance with claim 6 wherein said input source further comprises means for providing an electrical reference signal to said means for indicating said first and second measured phases, said reference signal corresponding to the frequency difference between said two different stabilized frequencies.

9. An interferometer system in accordance with claim 1 wherein said optical system means further comprises a polarization beamsplitter.

10. An interferometer system in accordance with claim 9 wherein said optical system means further comprises two quarter-wave phase retardation plates.

11. An interferometer system in accordance with claim 10 wherein said optical system means further comprises a first retroreflector.

12. An interferometer system in accordance with claim 2 wherein said optical system means further comprises a polarization beamsplitter.

13. An interferometer system in accordance with claim 9 wherein said means for recombining said first and second output beams into said third output beam comprises said polarization beamsplitter.

14. An interferometer system in accordance with claim 12 wherein said means for recombining said first and second output beams into said third output beam comprises said polarization beamsplitter.

15. An interferometer system in accordance with claim 1 wherein said means for mixing said orthogonal components of said third output beam comprises a first polarizer.

16. An interferometer system in accordance with claim 2 wherein said means for mixing said orthogonal components of said third output beam comprises a first polarizer.

17. An interferometer system in accordance with claim 1 wherein said means for producing said first electrical measurement signal comprises a first photoelectric detector.

18. An interferometer system in accordance with claim 2 wherein said means for producing said first electrical measurement signal comprises a first photoelectric detector.

19. An interferometer system in accordance with claim 1 wherein said means for indicating said first measured phase comprises a first phase meter/accumulator.

20. An interferometer system in accordance with claim 2 wherein said means for indicating said first measured phase comprises a first phase meter/accumulator.

21. An interferometer system in accordance with claim 1 wherein said means for producing said fourth and fifth output beams comprises said optical system and a retroreflector.

22. An interferometer system in accordance with claim 2 wherein said means for producing said fourth and fifth output beams comprises said optical system and a retroreflector.

23. An interferometer system in accordance with claim 21 wherein said optical system means comprises another retroreflector.

24. An interferometer system in accordance with claim 22 wherein said optical system means comprises another retroreflector.

25. An interferometer system in accordance with claim 23 wherein said optical system means further comprises a polarization beamsplitter.

26. An interferometer system in accordance with claim 24 wherein said optical system means further comprises a polarization beamsplitter.

27. An interferometer system in accordance with claim 23 wherein said means for recombining said fourth and fifth output beam comprises said polarization beamsplitter.

28. An interferometer system in accordance with claim 23 wherein said means for recombining said fourth and fifth output beam comprises said polarization beamsplitter.

29. An interferometer system in accordance with claim 26 wherein said means for recombining said fourth and fifth output beam comprises said polarization beamsplitter.

30. An interferometer system in accordance with claim 9 wherein said means for recombining said fourth and fifth output beam comprises said polarization beamsplitter.

31. An interferometer system in accordance with claim 30 wherein said frequency stabilized input beam source comprises a laser.

32. An interferometer system in accordance with claim 26 wherein said optical system means further comprises a polarization beamsplitter.

33. An interferometer system in accordance with claim 2 wherein said optical system means further comprises a polarization beamsplitter.

34. An interferometer system in accordance with claim 15 wherein said optical system means further comprises a polarization beamsplitter.

35. An interferometer system in accordance with claim 16 wherein said optical system means further comprises a polarization beamsplitter.

36. An interferometer system in accordance with claim 1 wherein said means for producing said second electrical measurement signal comprises a second photodetector.

37. An interferometer system in accordance with claim 2 wherein said means for producing said second electrical measurement signal comprises a second photodetector.

38. An interferometer system in accordance with claim 1 wherein said means for indicating said second measured phase comprises a second phase meter/accumulator.

39. An interferometer system in accordance with claim 2 wherein said means for indicating said second measured phase comprises a second phase meter/accumulator.

40. An interferometer system in accordance with claim 10 wherein said means for dividing said input beam into said two parallel spatially displaced beams, said two quarter-wave phase retardation plates, and said stationary plane mirror are mounted with minimal air paths and maximal thermal contact with said polarization beamsplitter.

41. An interferometer system in accordance with claim 1 further comprising means associated with said means for indicating said first and second measured phases for providing an output equal to one-half the sum of the outputs associated which said first and second measured phase indicating means for providing an output indicative of the linear displacement of said movable plane mirror.

42. An interferometer system in accordance with claim 41 wherein said means for indicating said first measured phase comprises a first phase meter/accumulator.

43. An interferometer system in accordance with claim 42 wherein said means for indicating said second measured phase comprises a second phase meter/accumulator.

44. An interferometer system in accordance with claim 40 further comprising means associated with said means for indicating said first and second measured phases for providing an output equal to one-half the sum of the outputs associated which said first and second measured phase indicating means for providing an output indicative of the linear displacement of said movable plane mirror.

45. An interferometer system in accordance with claim 40 further comprising means associated with said means for indicating said first and second measured phases for providing an output equal to the difference between the outputs associated with said first and second measured phase indicating means for providing said output directly proportional to the angular displacement of said movable plane mirror.

46. An interferometer system in accordance with claim 1 further comprising means associated with said means for indicating said first and second measured phases for providing an output equal to the difference between the outputs associated with said first and second measured phase indicating means for providing said output directly proportional to the angular displacement of said movable plane mirror.

47. An interferometer system in accordance with claim 46 wherein said means for indicating said first measured phase comprises a first phase meter/accumulator.

48. An interferometer system in accordance with claim 47 wherein said means for indicating said second measured phase comprises a second phase meter/accumulator.

49. An interferometer system in accordance with claim 40 wherein said frequency stabilized input beam source comprises a laser.

50. An interferometer system in accordance with claim 41 wherein said frequency stabilized input beam source comprises a laser.

51. An interferometer system in accordance with claim 46 wherein said frequency stabilized input beam source comprises a laser.

* * * * *